United States Patent [19]
Zalewski et al.

[11] Patent Number: 5,599,249
[45] Date of Patent: Feb. 4, 1997

[54] PART-TIME DOUBLE OFFSET TRANSFER CASE

[75] Inventors: John D. Zalewski, Liverpool; James S. Brissenden, Baldwinsville, both of N.Y.

[73] Assignee: New Venture Gear, Inc., Troy, Mich.

[21] Appl. No.: 516,439

[22] Filed: Aug. 17, 1995

[51] Int. Cl.$^6$ ............... B60K 17/344; B60K 23/08; F16H 37/06
[52] U.S. Cl. ............... 475/202; 180/24; 475/204; 475/206
[58] Field of Search ............... 475/202, 204, 475/206, 222, 223, 295; 180/247, 248, 249, 250

[56] References Cited

U.S. PATENT DOCUMENTS

| | | | |
|---|---|---|---|
| 2,850,920 | 9/1958 | Buckendale | 180/248 X |
| 3,929,200 | 12/1975 | Behar | 180/250 |
| 4,632,207 | 12/1986 | Moore | 180/247 |
| 4,677,873 | 7/1987 | Eastman et al. | 74/665 GE |
| 4,688,447 | 8/1987 | Dick | 74/665 F |
| 4,938,738 | 7/1990 | Fuelberth et al. | 475/317 |
| 5,078,660 | 1/1992 | Williams et al. | 475/84 |
| 5,106,351 | 4/1992 | Williams et al. | 475/250 |
| 5,116,293 | 5/1992 | Reuter | 475/202 |
| 5,159,847 | 11/1992 | Williams et al. | 74/337.5 |
| 5,269,399 | 12/1993 | Ito et al. | 180/248 X |
| 5,358,454 | 10/1994 | Bowen et al. | 475/94 |
| 5,363,938 | 11/1994 | Wilson et al. | 180/233 |

*Primary Examiner*—Charles A. Marmor
*Assistant Examiner*—Nathan O. Jensen
*Attorney, Agent, or Firm*—Harness, Dickey & Pierce, P.L.C.

[57] ABSTRACT

A power transfer system for a four-wheel drive vehicle is disclosed having a part-time transfer case with its input angled relative to its outputs by means of a constant velocity (CV) universal joint. More specifically, the transfer case input includes a first rotary member adapted to be rotatably driven about the rotary axis of the transmission output shaft, a second rotary member supported for rotation about a second rotary axis that is angled relative to the first rotary axis, and a CV joint interconnecting the first and second rotary members. The transfer case outputs include a pair of rotary output members supported for relative rotation about a common third rotary axis that is offset from the second rotary axis. A torque transfer arrangement is provided for transferring torque from the transfer case input to its outputs. As such, the CV joint allows the transfer case to be angulated so that reduced departure angles are achieved with respect to the prop shaft connections. The part-time transfer case includes a two-speed reduction apparatus and a mode shift arrangement for permitting the vehicle operator to select operation in various two-wheel and four-wheel drive modes.

15 Claims, 10 Drawing Sheets

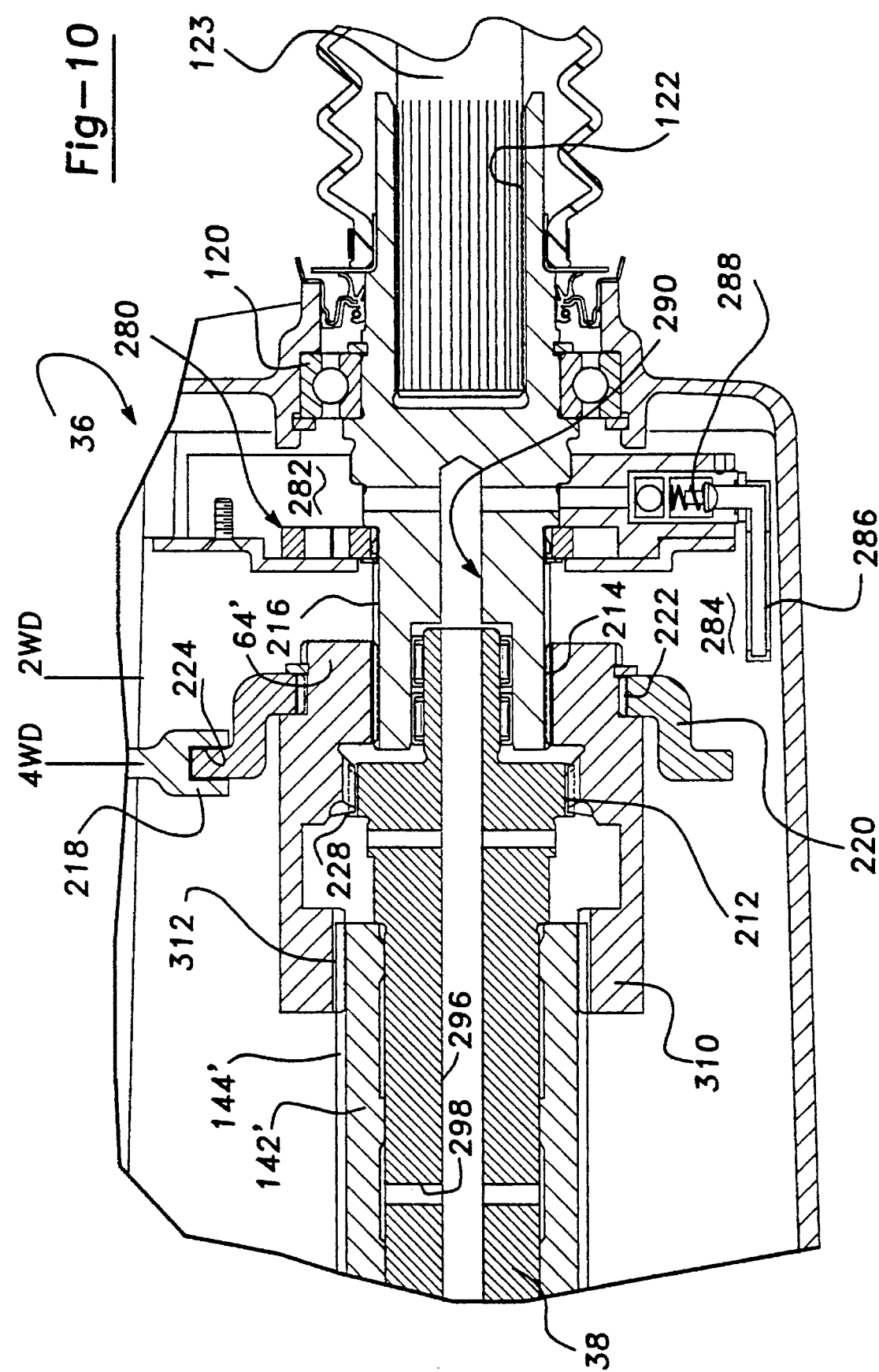

PART-TIME DOUBLE OFFSET TRANSFER CASE

BACKGROUND OF THE INVENTION

The present invention relates to a power transfer system for a four-wheel drive motor vehicle and, in particular, to a part-time transfer case having means for establishing an angular driving connection between the transfer case input and the output of a multi-speed transmission.

In view of the increased popularity of four-wheel drive vehicles, a plethora of power transfer systems are currently utilized for distributing tractive power (i.e., drive torque) to all four wheels of the motor vehicle. Conventionally, most four-wheel drive power transfer systems include a transfer case having an input shaft driven by the transmission output shaft, a rear output shaft driven by the input shaft and which is interconnected via a rear prop shaft to a rear axle assembly for driving the rear wheels, a front output shaft interconnected via a front prop shaft to a front axle assembly for driving the front wheels, and a torque transfer arrangement for continuously or selectively transferring drive torque from the rear output shaft to the front output shaft.

In "part-time" four-wheel drive systems, the transfer case is equipped with a shift mechanism which permits the vehicle operator to selectively couple and de-couple the front and rear output shafts for shifting the vehicle between a two-wheel drive mode and a four-wheel drive mode. An example of a part-time transfer case is shown and disclosed in commonly-owned U.S. Pat. No. 5,159,847 to Williams et al. In "full-time" four-wheel drive systems, the transfer case is equipped with an interaxle differential for continuously dividing drive torque between the front and rear output shafts while permitting speed differentiation therebetween. Commonly-owned U.S. Pat. No. 4,677,873 to Eastman et al. discloses an exemplary full-time transfer case. In order to prevent traction loss due to excessive wheel slip, most full-time transfer cases are also equipped with a "slip limiting" device for selectively or automatically locking the interaxle differential to limit or prevent speed differentiation in response to the wheel slip. Commonly-owned U.S. Pat. Nos. 5,078,660 and 5,106,351 to Williams et al. disclose exemplary full-time transfer cases equipped with a viscous coupling for limiting slip across the interaxle differential.

Alternatively, "on-demand" power transfer systems are used for automatically directing power to the non-driven wheels, without any input or action on the part of the vehicle operator, when traction is lost at the driven wheels. Typically, a speed-sensitive torque transfer device is installed between the front and rear output shafts for progressively delivering torque to the front output shaft in response to increasing speed differential therebetween. Such torque transfer devices commonly include viscous couplings, geared coupling and the like. An exemplary geared torque transfer device is disclosed in commonly-owned U.S. Pat. No. 5,358,454 to Bowen et al. More recently, however, the torque transfer device used in on-demand four-wheel drive systems has been a modulatable clutch, the output of which is controlled electronically in response to various detected vehicle operating parameters. An example of an electronically-controlled on-demand power transfer system is disclosed in commonly-owned U.S. Pat. No. 5,363,938 to Wilson et al.

Transfer cases are commonly classified as being either of a single offset type or a double offset type. In single offset transfer cases, only one of the output shafts is offset from the rotational axis of the input shaft. In particular, several of the above-noted commonly owned patents illustrate a conventional arrangement wherein the rotary axis of the rear output shaft is commonly aligned with that of the input shaft while the rotary axis of the front output shaft is parallel to, yet offset from, the rotary axis of the input shaft. However, a problem commonly associated with this type of transfer case is that the rear prop shaft, due to its central alignment, takes up a substantial amount of the vehicle's underbody space which inhibits placement of an underbody spare tire and/or necessitates usage of a saddle-type gas tank. In double offset transfer cases, the front and rear output shafts are commonly aligned and are both offset from the rotary axis of the input shaft. Accordingly, such double offset transfer cases provide increased underbody space for purposes of locating a spare tire and/or installing a larger fuel tank.

A major design consideration in the development of four-wheel drive systems is to minimize the departure angles at the connections between the transfer case front and rear output shafts and their corresponding prop shafts. The departure angle is defined as the included angle between the rotary axis of the prop shaft and that of the transfer case output shaft. Traditionally, single cardon universal joints are used at each end of the prop shafts if the departure angle is less than about five degrees. If the departure angles exceed this threshold limit, then more expensive double cardon universal joints are required at the prop shaft/transfer case connection. As an alternative, U.S. Pat. Nos. 4,632,207 to Moore and 5,116,293 to Reuter disclose the use of a constant velocity (CV) joint at the front output of a single offset type of transfer case. An alternative arrangement is likewise shown in U.S. Pat. No. 4,688,447 to Dick. While such arrangements attempt to solve the problems associated with large departure angles at the front output, they do not address this concern at the rear output nor are the teachings applicable to double offset transfer cases.

SUMMARY OF THE INVENTION

Accordingly, the present invention is directed to overcoming the disadvantages associated with conventional four-wheel drive vehicles by providing a power transfer system having a transfer case with its input angled relative to its outputs by means of a constant velocity (CV) universal joint. More specifically, the input for the transfer case includes a first rotary member adapted to be driven about the rotary axis of the transmission output shaft, a second rotary member supported for rotation about a second rotary axis that is angled relative to the first rotary axis, and a CV joint interconnecting the first and second rotary members. The outputs for the transfer case include a pair of rotary output members supported for rotation about a third rotary axis that is offset from the second rotary axis. As such, the CV joint allows the transfer case to be angulated so that reduced departure angles are achieved with respect to the prop shaft connections.

A further feature of the present invention is to provide a CV joint in the input section of a part-time transfer case. In one preferred form, the part-time transfer case is equipped with a two-speed reduction apparatus, a mode clutch, and a shift mechanism that are cooperatively operable for establishing a Two-Wheel High-Range drive mode (2WH), a Four-Wheel High-Range drive mode (4WH), a Neutral non-driven mode (N), and a Four-Wheel Low-Range drive mode (4WL).

Another feature of the present invention is to provide means for shifting the mode clutch "on-the-fly" between its two-wheel drive and four-wheel drive operating positions.

3

BRIEF DESCRIPTION OF THE DRAWINGS

Further objects, features, and advantages of the present invention will become apparent from analysis of the following written specification, the accompanying drawings, and the appended claims in which:

FIG. 10 Is a sectional view of an alternative construction for the mode clutch.

DETAILED DESCRIPTION OF THE PREFERRED EMBODIMENTS

In general, the present invention is directed to a part-time transfer case for use in four-wheel drive vehicles which is equipped with a constant velocity (CV) type universal joint for angling the transfer case input relative to its outputs so as to reduce the departure angles of the front and rear drivelines relative thereto. The reduced driveline angles facilitate the use of less expensive single cardon joints at the transfer case outputs in substitution for the traditional, more expensive, double cardon variety. The following written disclosure, when taken in conjunction with the drawings and claims, is intended to describe the best mode known to the inventors for making the inventive concepts claimed.

Figure 1:
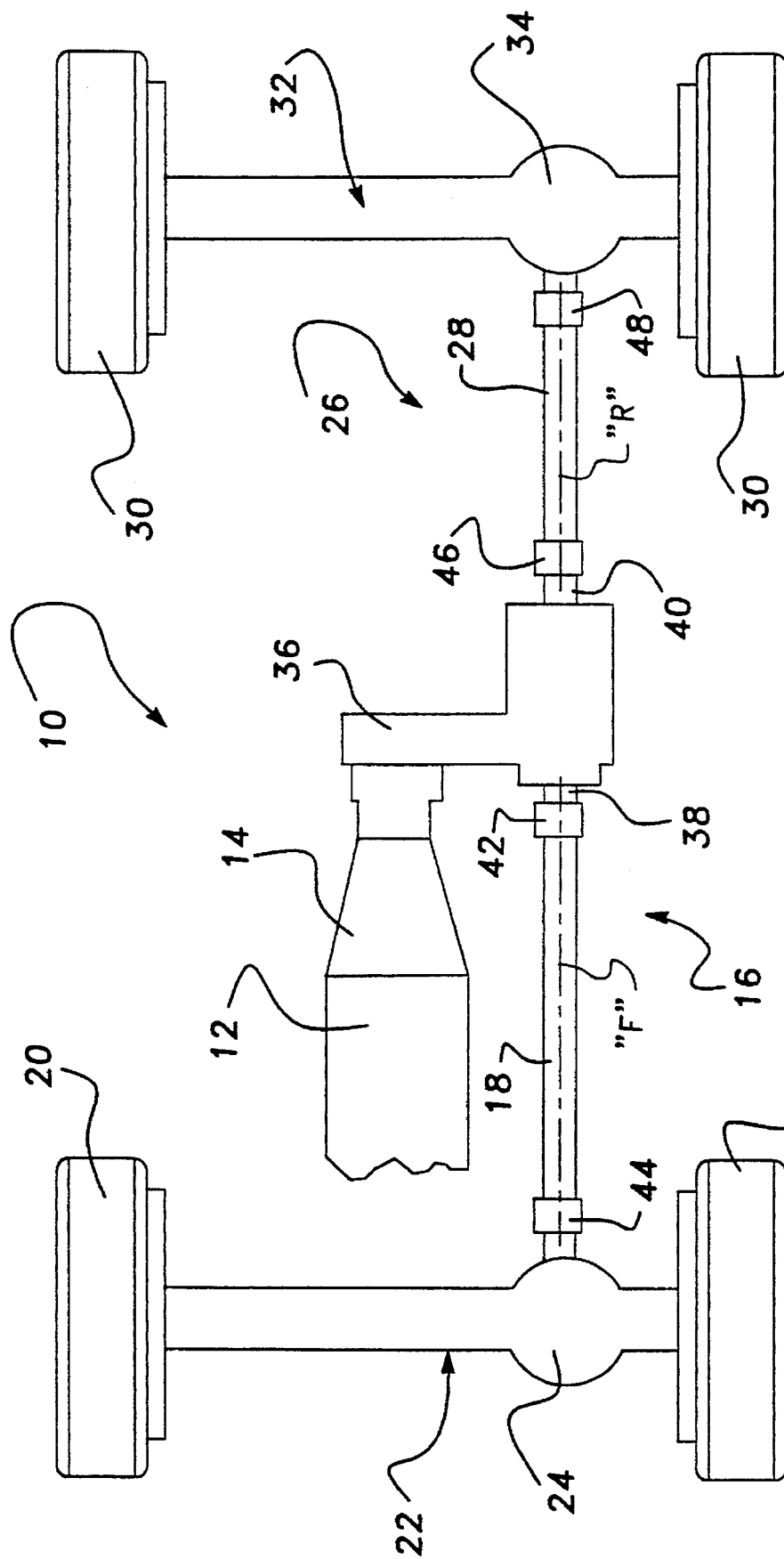
FIG. 1 a top plan view of a power transfer system for a four-wheel drive motor vehicle utilizing the double offset transfer case of the present invention for connecting the drivetrain to the front and rear drivelines.
Figure 2:
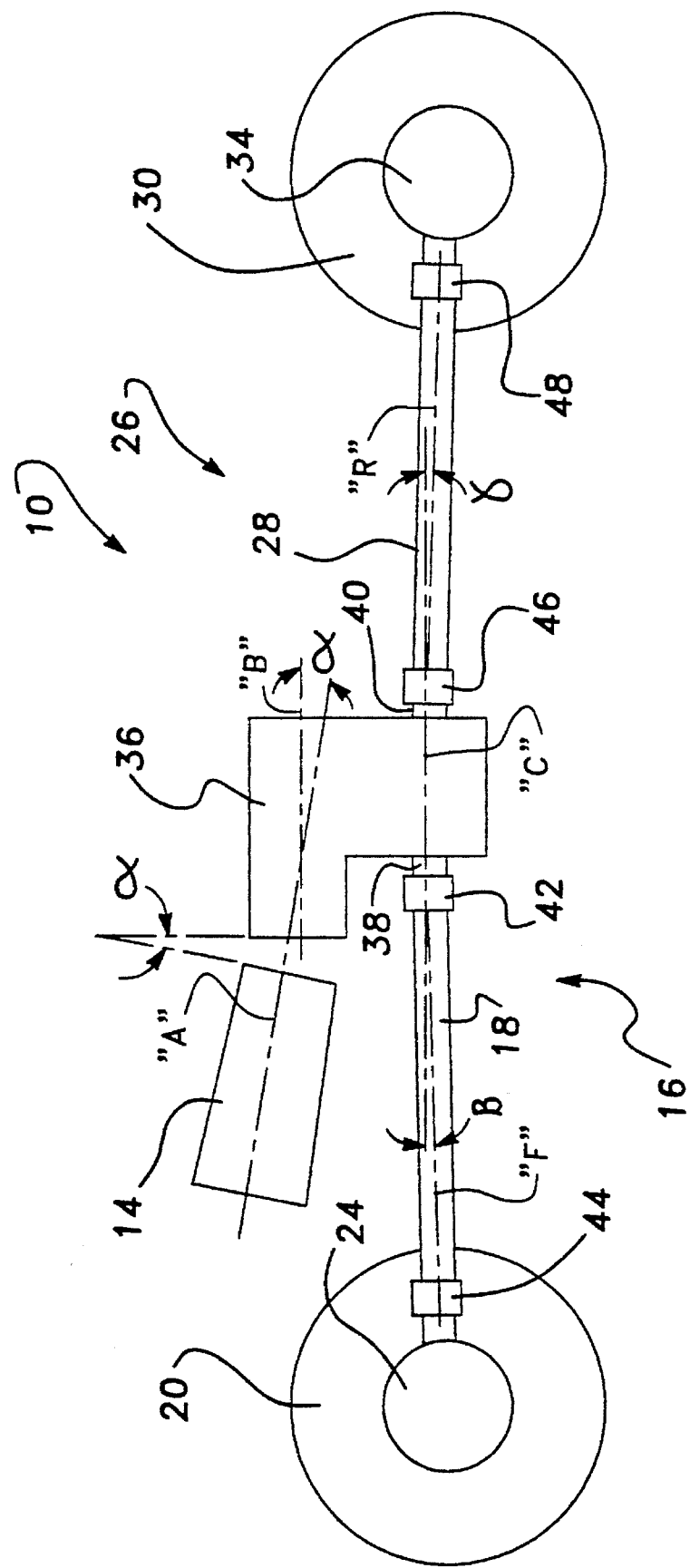
FIG. 2 is a side view of FIG. 1, illustrating the angular relationship between the input of the transfer case and the output of the drivetrain as well as the angular relationship between the front and rear drivelines and the transfer case outputs.

Referring to FIGS. 1 and 2 of the drawings, a power transfer system for a four-wheel drive vehicle is shown which incorporates the novel principles and features of the present invention. The vehicle includes a drivetrain 10 defined schematically by an engine 12 and a transmission 14. The vehicle also includes a front driveline 16 defined by a front prop shaft 18 that is interconnected to a pair of front wheels 20 via a front axle assembly 22 including a front differential 24. As seen, front prop shaft 18 is adapted to rotate about an axis, denoted by reference letter "F". A rear driveline 26 is defined by a rear prop shaft 28 that is interconnected to a pair of rear wheels 30 via a rear axle assembly 32 including a rear differential 34. Likewise, rear prop shaft 28 is adapted to rotate about an axis, denoted by reference letter "R". Drivetrain 10 is coupled to front driveline 16 and rear driveline 26 via a transfer case 36. As will be discussed with greater specificity hereinafter, transfer case 36 has an input 37 that is driven by the output of transmission 14, a front output shaft 38, a rear output shaft 40, and a torque transfer arrangement 41 for selectively transferring torque from input 37 to front and rear output shafts 38 and 40, respectively. Front output shaft 38 is connected to the rearward end of front prop shaft 18 via a conventional single cardon universal joint 42. Similarly, the forward end of front prop shaft 18 is connected to front differential 24 by means of a single cardon universal joint 44. Likewise, rear output shaft 40 is connected to a forward end of rear prop shaft 28 via a single cardon universal joint 46 while the rearward end of rear prop shaft 28 is connected to rear differential 34 by means of a single cardon universal joint 48.

Figure 3:
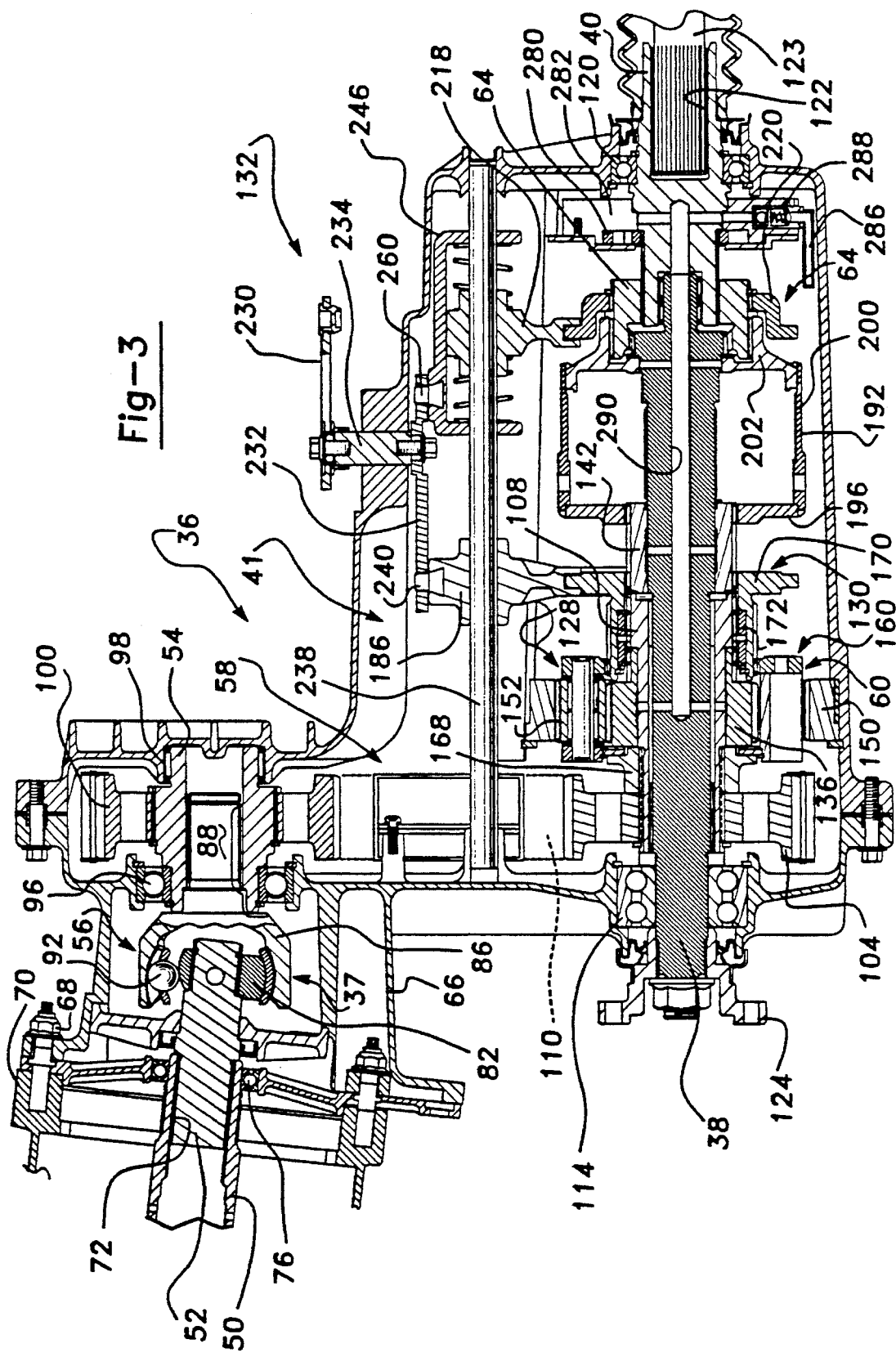
FIG. 3 is a section view of the double offset transfer case of the present invention.
Figure 4:
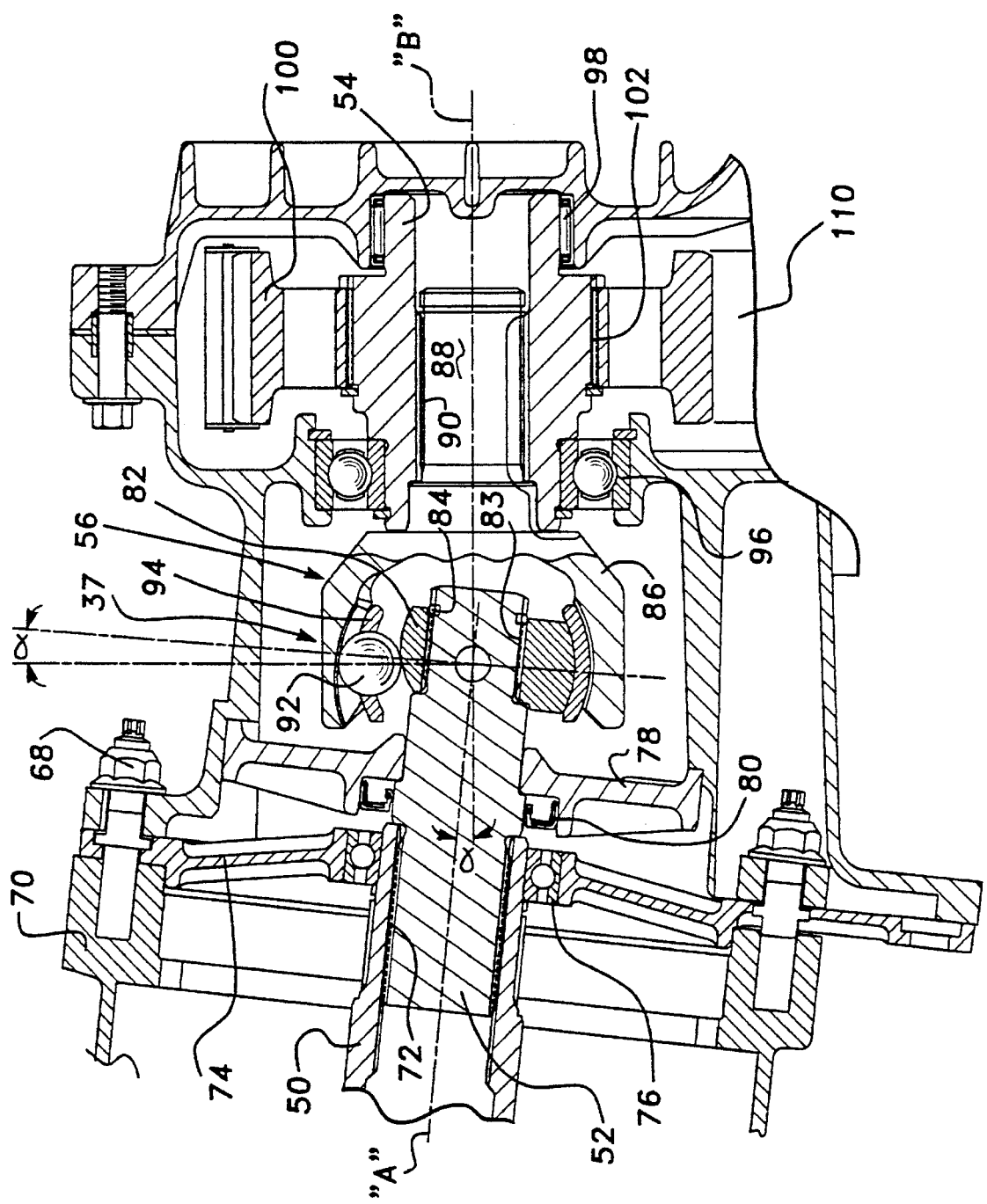
FIG. 4 is an enlarged partial view of FIG. 3 showing the integration of a CV joint into the input section of the transfer case in greater detail.

As best seen from FIGS. 2 and 3, transmission 14 includes an output shaft 50 that is connected to input 37 of transfer case 36. Input 37 is an assembly of components including a first rotary member or input shaft 52 that is angularly interconnected to a second rotary member or drive shaft 54 via a constant velocity (CV) universal joint 56. As seen, input shaft 52 is supported for rotation about a first axis of rotation, denoted by reference letter "A". Moreover, drive shaft 54 is supported within transfer case 36 for rotation about a second axis of rotation, denoted by reference letter "B". Rear output shaft 40 is supported for rotation about a third axis of rotation, denoted by reference letter "C". Moreover, front output shaft 38 is supported for rotation relative to rear output shaft 40 and is commonly aligned to rotate about third axis "C". Thus, transfer case 36 is of the "double offset" variety providing a lateral offset between its input and both of its outputs. As will be detailed, torque transfer arrangement 41 selectively transmits drive torque from drive shaft 54 to front output shaft 38 and rear output shaft 40 through a drive connection 58, a two-speed reduction apparatus 60 and a mode clutch 64.

Rotary axis "A" of transmission output shaft 50 and transfer case input shaft 52 is vertically coplanar with rotary axis "B" of drive shaft 54. Preferably, front axis "F" and rear axis "R" are both vertically coplanar with rotary axis "C" of transfer case output shafts 38, 40. From FIGS. 2 and 3, it is shown that the rotary axis "B" of drive shaft 54 intersects the rotary axis "A" of input shaft 52 at an input angle, denoted by ($\alpha$). This angular relationship, permitted via CV joint 56, essentially tips transfer case 36 such that the front departure angle, denoted by ($\beta$), between rotary axis "F" of front prop shaft 18 and rotary axis "C" of front output shaft 38 can be substantially reduced. Similarly, this angulated input arrangement provides a reduction in the rear departure angle, denoted by ($\gamma$), between rotary axis "R" of rear prop shaft 28 and rotary axis "C" of rear output shaft 40. According to one driveline application now contemplated, an input angle ($\alpha$) of about five degrees results in departure angles ($\beta$) and ($\gamma$) of less than two degrees. As noted, such reduced departure angles facilitate the use of less costly universal joints and provide a significant advantage over prior art systems. Obviously, the particular input and departure angles selected will depend on each specific transfer case and driveline application.

With particular attention now drawn to FIGS. 3 through 8, the various components of transfer case 36 will now be described with greater specificity. Transfer case 36 includes a housing 66 that is secured via bolts 68 to transmission housing 70. A splined connection 72 couples transmission output shaft 50 to one end of input shaft 52. Transmission output shaft 50 is shown supported in housing 66 via an apertured cover plate 74 and a suitable bearing assembly 76. Likewise, input shaft 52 is shown supported for rotation in housing 66 via an apertured support plate 78 and a suitable seal 80. An inner race 82 of a Rzeppa-type CV joint 56 is fixed via a splined connection 83 to the stepped opposite end of input shaft 52 and retained thereon via a retaining ring 84. An outer race 86 surrounds inner race 82 and has an integral stub shaft 88 that is coupled via a splined connection 90 to drive shaft 54. A plurality of balls 92, entrapped by a cage 94, are disposed between and in contact with inner race 82 and outer race 86. It is contemplated that any suitable type and size of CV joint can be used for providing the angular connection at the input of transfer case 36.

Drive shaft 54 is supported from housing 66 by a pair of axially-spaced bearing assemblies 96 and 98 for rotation about the "B" rotary axis. A drive sprocket 100 is fixed via a splined connection 102 to the outer periphery of drive shaft 54 for common rotation therewith. Drive connection 58 also includes a driven sprocket 104 that is fixed via a splined connection 106 for common rotation with an elongated tubular quill shaft 108. A drive chain 110, shown in phantom, interconnects driven sprocket 106 to drive sprocket 100. Quill shaft 108 concentrically surrounds a portion of front output shaft 38 and is supported thereon for relative rotation via suitable bearing assemblies 112 and 113. Moreover, one end of front output shaft 38 is supported from housing 66 via a suitable bearing assembly 114 while its opposite end is piloted in a bore 116 formed in one end of rear output shaft 40 and supported therein via a suitable bearing assembly 118. The opposite end of rear output shaft 40 extends out of housing 66 and is supported therefrom via bearing assembly 120. The portion of rear output shaft 40 which extends beyond housing 66 includes an internally-splined bore 122 adapted to receive an externally-splined yoke 123 of universal joint 46. Similarly, the portion of front output shaft 38 extending out of housing 66 includes a yoke 124 adapted for connection to a mating portion of universal joint 42.

Figure 5:
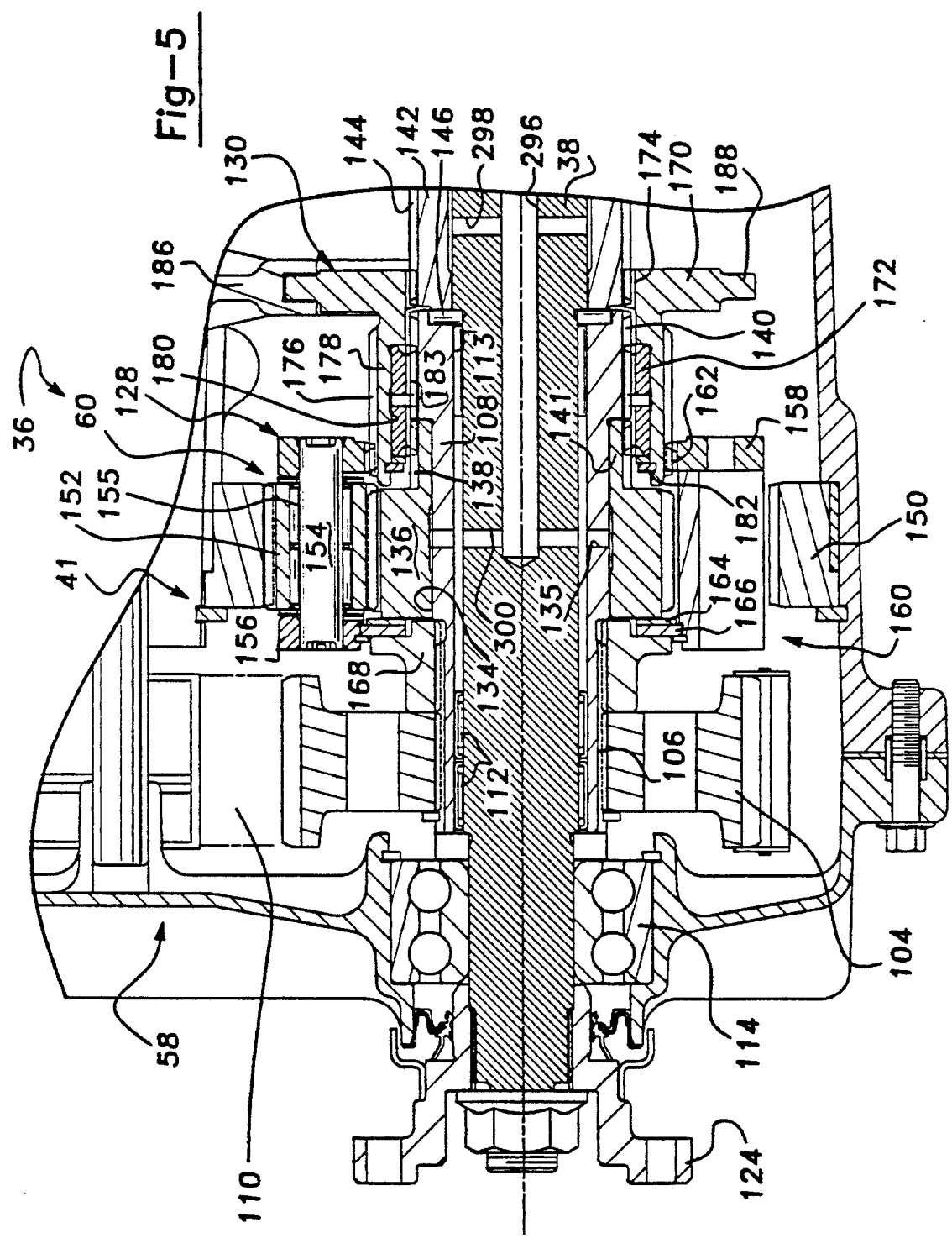
FIG 5. is another enlarged partial view of FIG. 3 showing the two-speed reduction apparatus in greater detail.

Referring particularly to FIGS. 3 and 5, two-speed reduction apparatus 60 is shown to include a planetary gear assembly 128 and a range clutch 130. Planetary gear assembly 128 is selectively driven by quill shaft 108 via axial movement of range clutch 130 in response to actuation of a shift mechanism 132 for establishing a high-speed and a low-speed drive connection and a non-driven condition with a drive hub 142. Quill shaft 108 has an external bearing surface 134 on which a sun gear 136 is journally supported. Radial ports 135 in quill shaft 108 provide a lubrication flow path to bearing surface 134. Sun gear 136 includes an integral axial extension 141 on which external clutch teeth 138 are formed. In addition, clutch teeth 140 are formed on an annular end portion of quill shaft 108 such that clutch teeth 140 are located adjacent to, and are alignable with, sun gear clutch teeth 138. Drive hub 142 is journally supported on front output shaft 38 and has external clutch teeth 144 which are located adjacent to, and are alignable with, quill shaft clutch teeth 140. A radial bearing assembly 146 is disposed between drive hub 142 and quill shaft 108 to facilitate relative rotation therebetween.

Planetary gear assembly 128 also includes a ring gear 150 that is fixed to housing 66 so as to be held stationary relative thereto. A plurality of pinion gears 152 (only one shown) are each journally supported on a pin 154 via a bearing assembly 155. Each pin 154 extends between fore and aft carrier rings 156 and 158, respectively, which, combined with pins 154 and pinion gears 152, define a planet carrier 160. Pinion gears 152 mesh with sun gear 136 and ring gear 150. Internal clutch teeth 162 are formed on aft carrier ring 158. A suitable thrust washer 164 separates sun gear 136 from a retaining ring 166 that is fixed to front carrier ring 156 and which rotates relative to a spacer hub 168 that is splined to quill shaft 108 for axially locating sun gear 136 relative to driven sprocket 104.

As best seen from FIG. 5, range clutch 130 includes a pair of sleeves 170 and 172 that are selectively engageable with one or more of sun gear 136, quill shaft 108 and drive hub 142 for establishing the two different speed drive connections and the non-driven condition between quill shaft 108 and drive hub 142. In particular, outer sleeve 170 has internal clutch teeth 174 which constantly engage external clutch teeth 144 of drive hub 142. Likewise, outer sleeve 170 has external clutch teeth 176 formed on a drum-like axial extension 178 that are selectively engageable with internal clutch teeth 162 on aft carrier ring 158. Inner sleeve 172 is rotatably supported against an inner bearing surface 180 of outer sleeve extension 178 and retained relative thereto by a snap ring 182. Inner sleeve 172 includes internal clutch teeth 183 that continuously mesh with external clutch teeth 140 of quill shaft 108 and which are also selectively engageable with either sun gear clutch teeth 138 or drive hub clutch teeth 144 depending on the axial position of range clutch 130. A shift fork 186 entraps a radial extension 188 of outer sleeve 170 and is selectively operable to move range clutch 130 between positions L, N, H which respectively represent a Low-Range drive connection, a Neutral non-driven condition and a High-Range drive connection. Range clutch 130 is shown positioned in the L position whereat clutch teeth 183 of inner sleeve 172 engages both sun gear clutch teeth 138 and quill shaft clutch teeth 140 while external clutch teeth 176 on outer sleeve engage carrier clutch teeth 162 and its internal clutch teeth 174 engage drive hub clutch teeth 144. As such, inner sleeve 172 couples sun gear 136 for common rotation with quill shaft 108. Thus, sun gear 136 drives pinion gears 152 around ring gear 150 such that planet carrier 160 is driven at a reduced or underdrive speed ratio relative to quill shaft 108. Moreover, due to the connection of planet carrier 160 to drive hub 142 via outer sleeve 170 of range clutch 130, drive hub 142 is also driven at the reduced ratio speed relative to quill shaft 108 for establishing the Low-Range drive connection therebetween.

When range clutch 130 is moved rightward to the N position, clutch teeth 183 of inner sleeve 172 are de-coupled from sun gear teeth 138 and thus only engage quill shaft clutch teeth 140. Moreover, clutch teeth 176 on outer sleeve 170 are uncoupled from planet carrier teeth 162 and clutch teeth 174 of outer sleeve 170 only engage drive hub clutch teeth 144. Since inner sleeve 172 is free to rotate relative to outer sleeve 170, there is no driven connection between quill shaft 108 and drive hub 142 through planetary gear assembly 128 so as to establish the Neutral non-driven condition. When range clutch 130 is moved farther to the right to its H position, a direct connection is established between quill shaft 108 and drive hub 142. In particular, in the H position, outer sleeve 170 is uncoupled from planet carrier 160 and its internal clutch teeth 174 are engaged with drive hub clutch teeth 144. In addition, clutch teeth 183 of inner sleeve 172 engage both quill shaft clutch teeth 140 and drive hub clutch teeth 144. Thus, range clutch 130 directly couples drive hub 142 to quill shaft 108 for establishing the High-Range drive connection. An advantageous feature of planetary gear assembly 128 is that sun gear 136 is disconnected from driven connection to quill shaft 108 such that planetary gear assembly 128 remains stationary during High-Range drive operation.

Figure 6:
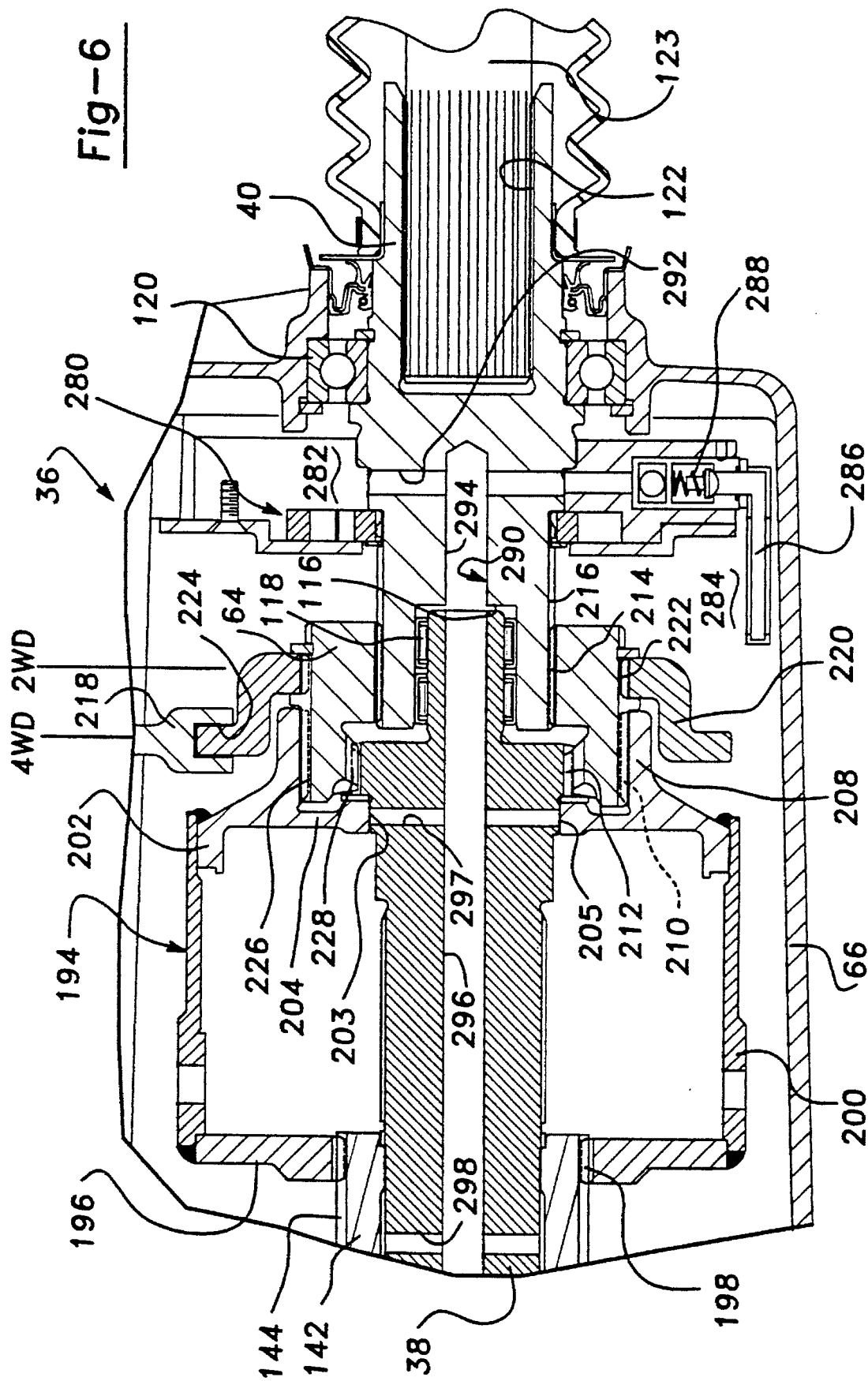
FIG. 6 is also an enlarged partial view of FIG. 3 showing the mode clutch in greater detail.

Referring now to FIG. 6, mode clutch 64 will be described in greater detail. However, prior to such disclosure, it should be noted that any arrangement capable of transferring torque from one shaft to another in response to a positive coupling therebetween is to be considered an equivalent device within the true spirit of this invention. According to the embodiment disclosed, a housing assembly 194 connects drive hub 142 to mode clutch 64 which, in turn, is coupled to rear output shaft 40 for rotation therewith. Housing assembly 194 includes a front cover plate 196 fixed by a splined connection 198 to clutch teeth 144 of drive hub 142, a cylindrical drum 200 fixed (i.e., welded) at one end to front cover 196, and a rear cover plate 202 fixed (i.e., welded) to the opposite end of drum 200. Rear cover plate 202 includes a radial disc-like segment 204 having a central aperture 203 that is journally supported on an outer bearing surface 205 of front output shaft 38. Thus, housing assembly 194 is supported for rotation relative to front output shaft 38. Rear cover plate 202 also includes an axial segment 208 having internal clutch teeth 210 formed thereon. External clutch teeth 212 are provided on the rearward end of front output shaft 38 in generally facing relation to internal clutch teeth 210 on rear cover plate 202. Mode clutch 64 has internal splines 214 that are constantly engaged with external splines 216 of rear output shaft 40 such that mode clutch 64 is supported for rotation with and axial sliding movement on rear output shaft 40 between a 4WD position and a 2WD position in response to movement of a second shift fork 218. An annular fork plate 220 is fixed via a splined connection 222 to mode clutch 64 and is entrapped within a groove 224 formed in the distal end of second shift fork 218. As will be detailed, shift mechanism 132 causes coordinated movement of shift forks 186 and 218 for establishing the various available drive modes.

As shown in FIG. 6, mode clutch 64 is in its 4WD position whereat its external clutch teeth 226 are meshed with internal clutch teeth 210 of rear cover plate 202 while its internal clutch teeth 228 are meshed with clutch teeth 212 of front output shaft 38. In this position, mode clutch 64 establishes a direct coupling between drive hub 142 and both rear output shaft 40 and front output shaft 38. Thus, drive torque is transferred equally to front and rear output shafts 38 and 40 and four-wheel drive operation is established. When moved to its 2WD position, mode clutch 64 is uncoupled from direct engagement with front output shaft 38 such that drive torque is only transferred from drive hub 142 to rear output shaft 40 for establishing two-wheel drive operation. Specifically, internal clutch teeth 228 of mode clutch 64 are de-coupled from external clutch teeth 212 of front output shaft 38 while its external clutch teeth 226 remain meshed with internal clutch teeth 210 on rear cover plate 202.

Figure 7:
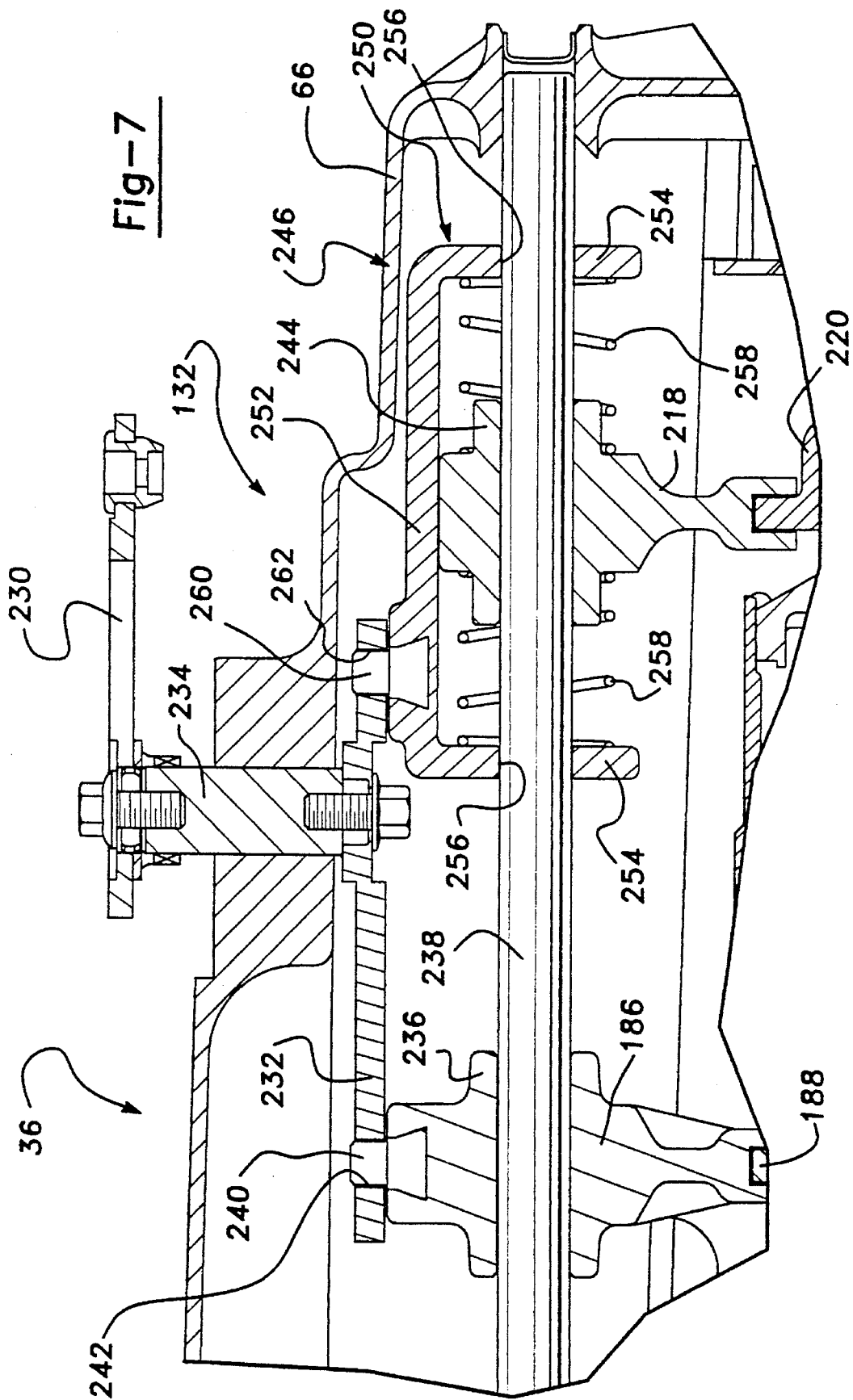
FIG. 7 is yet another enlarged partial view of FIG. 3 showing the manually-actuate shift mechanism provided for shifting the transfer case into various drive modes.

Referring now to FIG. 7, the various components associated with shift mechanism 132 for controlling coordinated movement of range clutch 130 and mode clutch 64 are shown with greater specificity. According to the construction shown, shift mechanism 132 is adapted to be coupled via conventional linkages to a manually-operable shift lever that is located within the passenger compartment of the motor vehicle and which is operable for permitting the vehicle operator to select operation of transfer case 36 in one of the available drive modes. In general, shift mechanism 132 includes a pivotable lever 230 that is coupled to a sector plate 232 via an actuator shaft 234. Shift forks 186 and 218 are each coupled to sector plate 232 via a follower pin and guide slot arrangement for changing the rotary output (i.e., torque) of lever 230 and sector plate 232 into axially-directed forces capable of moving range clutch 130 and mode clutch 64. In particular, shift fork 186 includes a tubular section 236 that is slidingly supported on a shaft 238 mounted to housing 66. A follower pin 240 is fixed to shift fork 186 and is confined within a range slot 242 formed in sector plate 232. The contour of range slot 242 is such that rotation of sector plate 232 in a first direction will shift range clutch 130 from the L position, through the N position, and into the H position. Obviously, reverse rotation of sector plate 232 results in the movement of range clutch 130 through the positions in opposite order.

Shift fork 218 is similar to shift fork 186 and likewise includes a tubular section 244 that is slidingly supported on shaft 238. A spring-biasing mechanism 246 is provided for applying a biasing load on shift fork 218 for assisting in completing engagement of mode clutch 64 with clutch teeth 212 on front output shaft 38 upon movement to its 4WD position. Spring-biasing mechanism 246 is adapted to provide a self-centering biasing load on mode clutch 64 to ensure lock-up after completion of the movement of sector plate 232 in those conditions where slight speed differences create blockage of clutch teeth 228 on mode clutch 64 from passing into engagement with clutch teeth 212 on front output shaft 38 until the blockage is eliminated. To this end, an angled bracket 250 is provided which has a leg section 252 and two bent arm sections 254 extending therefrom. Apertures 256 are formed in arm sections 254 through which shaft 238 extend. A pair of biasing springs 258 act between each arm section 254 and shift fork 218 for normally centering shift fork in a balanced equilibrium condition. A follower pin 260 is fixed to leg section 252 of bracket 250 and is disposed within a mode slot 262 formed in sector plate 232. The contour of mode slot 262 is designed to cause controlled axial movement of mode clutch 64 between its 4WD and 2WD positions in response to rotation of sector plate 232. Moreover, the contour of mode slot 262 and range slot 242 are engineered to produce coordinated movement of mode clutch 64 and range clutch 130 in response controlled rotation of sector plate 232 to establish each of the available drive modes.

According to the particular embodiment disclosed, sector plate 232 is designed to coordinate movement of range clutch 130 and mode clutch 64 to establish at least four different operational modes. These modes include a Two-Wheel high-range drive mode (2WH), a Four-Wheel high-range drive mode (4WH), a Neutral mode (N), and a Four-Wheel low-range drive mode (4WL). In the Two-Wheel high-range drive mode, range clutch 130 is located in its H position and mode clutch 64 is located in its 2WD position. In the Four-Wheel high-range drive mode, range clutch 130 is located in its H position and mode clutch 64 is located in its 4WD position. In the Neutral mode, range clutch 130 is located in its N position and mode clutch 64 is preferably in its 2WD position. Finally, in the Four-Wheel low-range drive mode, range clutch 130 is located in its L position and mode clutch 64 is located in its 4WD position. A detent poppet (not shown) is provided for positively locating sector plate 232 in each of its four different rotated positions establishing the (2WH), (4WH), (N) and (4WL) drive modes.

Spring-biasing mechanism 246 is operable to permit the vehicle operator to shift between the (4WH) and (2WH) drive modes without stopping the vehicle. In particular, if sector plate 232 is rotated from its position associated with the (2WH) mode to its position associated with the (4WH) mode then a tooth butting condition may momentarily prevents engagement of mode clutch teeth 228 with clutch teeth 212 of front output shaft 38. In response, the forward movement of bracket 250 caused by movement of pin 260 in mode slot 262 acts to compress the rear biasing spring 258 against shift fork 218. Compression of the rear one of biasing springs 258 exerts a biasing force on shift fork 218 of a sufficient magnitude to move mode clutch 64 into engagement with front output shaft 38 once the tooth butting condition between their respective clutch teeth 228 and 212 is removed. If front driveline 16 includes a "live" front axle assembly 22, then normal wind-up and/or a slight turning condition will quickly eliminate the tooth butting condition. If front driveline 16 is equipped with a remotely-actuated disconnect system (i.e., locking hubs, axle disconnect clutch, etc.) then movement of sector plate 232 to its 4WD position will actuate a position sensor for generating a signal that is sent to the controller for actuating the disconnect system to connect front output shaft 38 and remove the tooth butt condition. Thus, shift mechanism 132 permits transfer case 36 to be shifted "on-the-fly" between its two-wheel and four-wheel drive modes.

Figure 8:
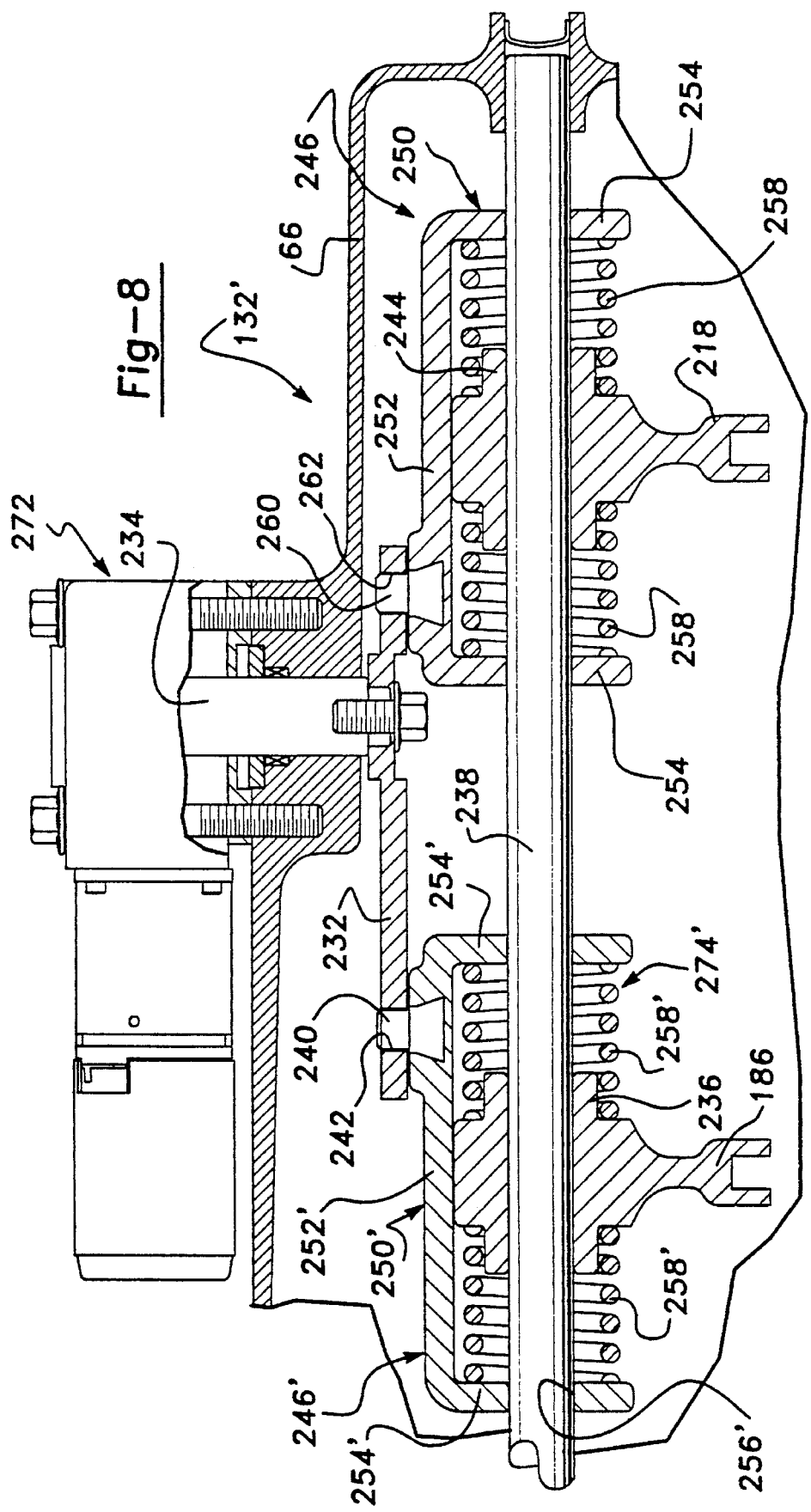
FIG. 8 is a view, similar to FIG. 7, illustrating an electrically-controlled shift mechanism adapted for use with the transfer case of the present invention.

FIG. 8 is a view, similar to FIG. 7, illustrating an alternative shift mechanism 132' used in association with an electrically-controlled shift system wherein the vehicle operator actuates push-button or rotary switches for actuating a rotary-driven actuator. As seen, identical or substantially similar functioning components of shift mechanism 132' that were previously disclosed in association with shift mechanism 130 are identified by the same reference numerals. Preferably, rotary actuator is an electric gearmotor 272 having a rotary output (not shown) coupled to actuator shaft 234. Thus, gearmotor 272 is adapted to controllably rotate sector plate 232 between its various rotated positions in response to the electrical control signal sent to gearmotor 272 from a remote electronic controller unit (not shown). The controller unit generates the control signals in response to the mode signals delivered thereto upon the vehicle operator actuating the selection switches or push-buttons. As is also seen, shift fork 186 is operably associated with a second spring-biasing mechanism 274. Spring-biasing mechanism 274 is substantially identical to spring-biasing mechanism 246 and includes an angled bracket 250' having leg 252' and arms 254', and a pair of biasing springs 258'. This biasing arrangement maintains a biasing load on shift fork 186 to ensure movement of range clutch 130 to either of the L and H positions following complete rotation of sector plate 232 by gearmotor 272 to its corresponding position. This arrangement is also adapted to avoid overloading of gearmotor 272 if a blockage condition momentarily inhibits full engagement of range clutch 130 with the clutch teeth on sun gear 136 and aft carrier ring 158. While the preferred electrically-controlled shift mechanism 130' uses only one electric actuator for controlling movement of two shift forks, it is contemplated that the transfer case of the present invention could be equipped with a pair of electric actuator for individually controlling movement of each shift fork.

As best seen from FIGS. 3, 5 and 6, a lubrication system is provided within housing 66 and includes a gerotor-type lube pump 280 confined within a enclosed pump chamber 282 and which is operable to draw fluid from a sump area 284 into an inlet conduit 286 and through a one-way flow valve 288 for delivery to a central flow passage 290 via a series of radial inlet ports 292. Central flow passage 290 includes a longitudinal bore 294 in rear output shaft 40 and a commonly-aligned bore 296 in front output shaft 38. Rotation of rear output shaft 40 causes lube pump 280 to draw fluid into central flow passage 290 from which it is delivered to bearing surface 205, drive hub 142 and quill shaft 108 via radial ports 297, 298 and 300, respectively.

Figure 9:
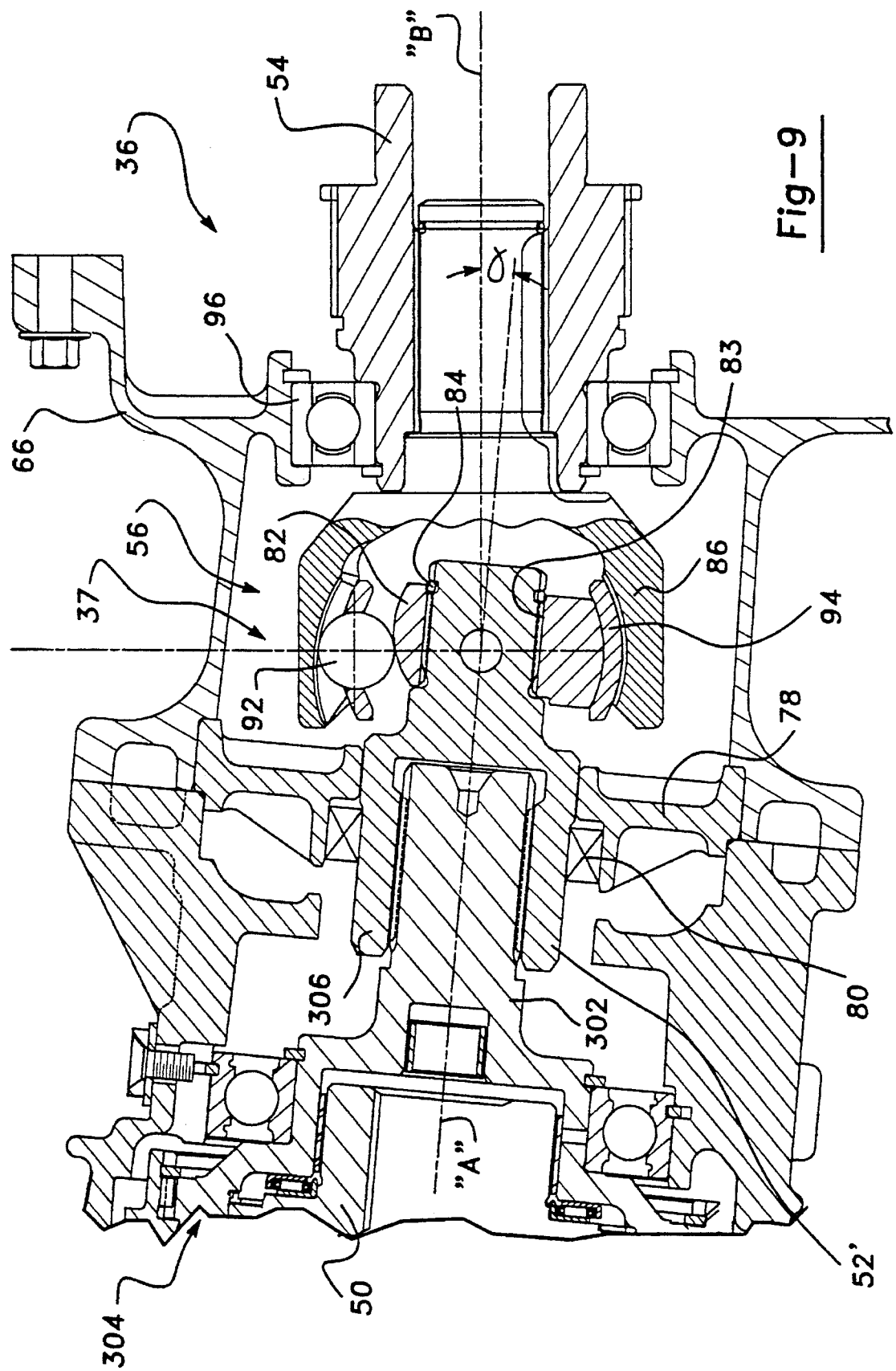
FIG. 9 is a sectional view of an alternative construction for the input section of the transfer Case.

The particular input components associated with input 37 of transfer case 36 will be dictated by the specific output components of transmission 14. Thus, while the embodiment disclosed teaches of using an input shaft 52 for coupling transmission output shaft 50 to one rotary component of CV joint 56, various other arrangements are contemplated. For instance, transmission output shaft 50 may be coupled directly to inner race 82 of CV joint 56. A specific alternative example is shown in FIG. 9 wherein an externally-splined output shaft 302 for an add-on overdrive unit 304 is coupled to an internally-splined drum portion 306 of an input shaft 52'. Add-on overdrive unit 304 is operable for providing an additional forward speed ratio for an existing multi-speed automatic transmission by causing its output shaft 302 to be driven at an overdrive speed ratio relative to transmission output shaft 50. Reference can be made to commonly-owned U.S. Pat. No. 4,798,103 to Eastman et al. for details of such an add-on overdrive unit.

With particular reference now to FIG. 10, an alternative construction for the mode clutch used in transfer case 36 will now be described. In general, housing assembly 194 (shown in FIG. 6) has been eliminated, drive hub 142' has been axially extended, and mode clutch 64' includes a tubular extension 310 formed with internal spline teeth 312 that meshingly engage clutch teeth 144' on drive hub 142'. Clutch teeth 312 are of a sufficient axial length to maintain engagement with drive hub teeth 144' during movement of mode clutch 64' between its 2WD and 4WD positions. As before, in its 4WD position mode clutch 64' couples drive hub 142' directly to front output shaft 38 and rear output shaft 40. However, upon movement of mode clutch 64' to its 2WD position, its internal clutch teeth 228 are uncoupled from external clutch teeth 212 of front output shaft 38 such that front output shaft 38 is disconnected from driven connection with drive hub 142'.

The foregoing discussion discloses and describes preferred embodiments of the present invention as contemplated by the inventors to set forth the best mode of carrying out the inventive concepts. One skilled in the art will readily recognize from such discussions, and from the accompanying drawings and claims, that various changes, modifications and variations can be made therein without departing from the true spirit and scope of the invention as defined by the following claims.

What is claimed is:

1. A power transfer apparatus for transferring drive torque from a vehicular drivetrain to first and second drivelines, comprising:

an input including a first input member adapted to be rotatably driven by the drivetrain about a first rotary axis, a second input member supported for rotation about a second rotary axis that is angled relative to said first rotary axis, and a constant velocity universal joint interconnecting said second rotary member for rotation with said first input member;

an output including first and second output members adapted to be respectively interconnected to the first and second drivelines, at least one of said output members being supported for rotation about a third rotary axis that is offset from said second rotary axis;

a drive member;

a drive connection interconnecting said drive member for driven rotation with said second input member;

first clutch means operable in a first position for interconnecting said drive member to said first output member for transferring drive torque to the first driveline so as to establish a two-wheel drive mode, and said first clutch means is operable in a second position for interconnecting said drive member to both of said first and second output members for transferring drive torque to both of the first and second drivelines so as to establish a part-time four-wheel drive mode; and a shift mechanism for moving said first clutch means between said first and second positions.

2. The power transfer apparatus of claim 1 further comprising a speed reduction apparatus for establishing a direct-drive high-range speed ratio connection and a reduced low-range speed ratio connection between said second input member and said drive member, and second clutch means that is movable between a high-range position for establishing said high-range connection and a low-range position for establishing said low-range connection, and wherein said shift mechanism is operable for moving said second clutch means between said high-range and low-range positions.

3. The power transfer apparatus of claim 2 wherein said shift mechanism includes movement coordinating means for causing coordinated movement of said first and second clutch means for establishing a two-wheel high-range drive mode, a part-time four-wheel high-range drive mode and a part-time four-wheel low-range drive mode.

4. The power transfer apparatus of claim 2 wherein said second clutch means is movable to a neutral position for disconnecting said drive member from driven connection with said second input member so as to establish a neutral non-driven mode.

5. The power transfer apparatus of claim 1 wherein said first and second output members are commonly aligned for relative rotation about said third rotary axis, said drive member includes a drive hub rotatably supported on said second output member, and wherein said first clutch means includes a housing coupled for rotation with said drive hub and a mode clutch coupling said housing to said first output member, said mode clutch is supported for sliding movement between said first position whereat clutch teeth on said mode clutch are disengaged from clutch teeth on said second output member, and said second position whereat said clutch teeth on said mode clutch meshingly engage said clutch teeth on said second output member.

6. The power transfer apparatus of claim I wherein said first and second output members are commonly aligned for relative rotation about said third rotary axis, said drive member includes a drive hub rotatably supported on said second output member, and wherein said first clutch means includes a mode clutch coupling said first output member to said drive hub, said mode clutch supported for sliding movement between said first position whereat clutch teeth on said mode clutch are disengaged from clutch teeth on said second output member, and said second position whereat said clutch teeth on said mode clutch meshingly engage said clutch teeth on said second output member.

7. A power transfer apparatus for transferring drive torque from a vehicular drivetrain to first and second drivelines, comprising:

an input including a first input member adapted to be rotatably driven by the drivetrain about a first rotary axis, a second input member supported for rotation about a second rotary axis that is angled relative to said first rotary axis, and a constant velocity universal joint interconnecting said second rotary member for rotation with said first input member;

an output including first and second output members adapted to be respectively interconnected to the first and second drivelines, at least one of said output members being supported for rotation about a third rotary axis that is offset from said second rotary axis;

a drive member;

a drive connection interconnecting said drive member for driven rotation with said second input member;

a mode clutch interconnecting said drive member to said first output member, said mode clutch operable in a 4WD position for coupling said second output member to said first output member for transferring drive torque to the first and second drivelines so as to establish a part-time four-wheel drive mode, and in a 2WD position for de-coupling said second output member from said first output member for transferring drive torque only to the first driveline so as to establish a two-wheel drive mode;

a speed reduction apparatus for establishing a direct-drive high-range speed ratio connection and a reduced low-range speed ratio connection between said second input member and said drive member, and a range clutch that is movable between a high-range position for establishing said high-range connection and a low-range position for establishing said low-range connection; and a shift mechanism for moving said range clutch and said mode clutch for establishing a two-wheel high-range drive mode, a part-time four-wheel high-range drive mode and a part-time four-wheel low-range drive mode.

8. The power transfer apparatus of claim 7 wherein said shift mechanism includes movement coordinating means movable between a first position for establishing said two-wheel high-range drive mode, a second position for establishing said part-time four-wheel high-range drive mode, and a third position for establishing said part-time four-wheel low-range drive mode, said shift mechanism further includes an actuator for causing movement of said movement coordinating means.

9. The power transfer apparatus of claim 7 wherein said range clutch is movable to a neutral position for disconnecting said drive member from driven connection with said second input member so as to establish a neutral non-driven mode.

10. The power transfer apparatus of claim 7 wherein said first and second output members are commonly aligned for relative rotation about said third rotary axis, said drive member includes a drive hub rotatably supported on said second output member and a housing coupled for rotation with said drive hub, and wherein said mode clutch couples said housing to said first output member and is supported for movement between said 2WD position whereat clutch teeth on said mode clutch are disengaged from clutch teeth on said second output member, and said 4WD position whereat said teeth on said mode clutch meshingly engage said clutch teeth on said second output member.

11. The power transfer apparatus of claim 7 wherein said first and second output members are commonly aligned for relative rotation about said third rotary axis, said drive member includes a drive hub rotatably supported on said second output member, and wherein said mode clutch couples said first output member to said drive hub and is supported for movement between said 2WD position whereat clutch teeth on said mode clutch are disengaged from clutch teeth on said second output member and said 4WD position whereat said teeth on said mode clutch meshingly engage said clutch teeth on said second output member.

12. A power transfer apparatus for transferring drive torque from a vehicular drivetrain to first and second drivelines, comprising:

an input including a first input member adapted to be rotatably driven by the drivetrain about a first rotary axis, a second input member supported for rotation about a second rotary axis that is angled relative to said first rotary axis, and a constant velocity universal joint interconnecting said second rotary member for rotation with said first input member;

an output including first and second output members adapted to be respectively interconnected to the first and second drivelines, said output members being supported for relative rotation about a third rotary axis that is offset from said second rotary axis;

a drive member;

a drive connection interconnecting said drive member for driven rotation with said second input member;

first clutch means operable in a first position for interconnecting said drive member to said first output member for transferring drive torque to the first driveline so as to establish a two-wheel drive mode, said first clutch means is operable in a second position for interconnecting said drive member to both of said first and second output members for transferring drive torque to both of the first and second drivelines so as to establish a part-time four-wheel drive mode;

a speed reduction apparatus for establishing a direct-drive high-range speed ratio connection and a reduced low-range speed ratio connection between said second input member and said drive member; second clutch means movable between a high-range position for establishing said high-range connection and a low-range position for establishing said low-range connection; and shift means for causing coordinated movement of said first and second clutch means for establishing a two-wheel high-range drive mode, a part-time four-wheel high-range drive mode and a part-time four-wheel low-range drive mode.

13. The power transfer apparatus of claim 12 wherein said second clutch means is movable to a neutral position for disconnecting said drive member from driven connection with said second input member so as to establish a neutral non-driven mode.

14. The power transfer apparatus of claim 12 wherein said drive member includes a drive hub rotatably supported on said second output member, and wherein said first clutch means includes a housing coupled for rotation with said drive hub, and a mode clutch coupling said housing to said first output member, said mode clutch is supported for movement relative to its connection between said housing and first output member between said first position whereat clutch teeth on said mode clutch are disengaged from clutch teeth on said second output member, and said second position whereat said clutch teeth on said mode clutch meshingly engage said clutch teeth on said second output member.

15. The power transfer apparatus of claim 12 wherein said drive member includes a drive hub rotatably supported on said second output member, and wherein said first clutch means includes a mode clutch coupling said first output member to said drive hub, said mode clutch is supported for movement relative to its connection between said drive hub and said first output member between said first position whereat clutch teeth on said mode clutch are disengaged from clutch teeth on said second output member, and said second position whereat said clutch teeth on said mode clutch meshingly engage said clutch teeth on said second output member.

* * * * *

UNITED STATES PATENT AND TRADEMARK OFFICE
CERTIFICATE OF CORRECTION

PATENT NO. : 5,599,249
DATED : February 4, 1997
INVENTOR(S) : John D. Zalewski, James S. Brissenden It is certified that error appears in the above-indentified patent and that said Letters Patent is hereby corrected as shown below:

IN THE ABSTRACT, lines 1 and 2, delete "is disclosed".

Column 2, line 23, "cardon" should be --cardan--.

Column 3, line 7, after "FIG. 1" insert --is--.

Column 3, line 27, "manually-actuate" should be --manually-actuated--.

Column 3, line 31, delete "and".

Column 3, line 33, "Case" should be --case--.

Column 3, line 47, "cardon" should be --cardan--.

Column 3, line 49, "cardon" should be --cardan--.

Column 4, line 9, "cardon" should be --cardan--.

Column 4, line 11, "cardon" should be --cardan--.

Column 4, line 13, "cardon" should be --cardan--.

Column 4, line 15, "cardon" should be --cardan--.

UNITED STATES PATENT AND TRADEMARK OFFICE
CERTIFICATE OF CORRECTION

PATENT NO. : 5,599,249
DATED : February 4, 1997
INVENTOR(S) : John D. Zalewski, James S. Brissenden It is certified that error appears in the above-indentified patent and that said Letters Patent is hereby corrected as shown below:

Column 8, line 67, "prevents" should be --prevent--.

Column 9, line 55, "actuator" should be --actuators--.

Column 9, line 59, "a" should be --an--.

Column 10, line 50, claim 1, delete "adapted to be".

Column 10, line 58, claim 1, delete "adapted to be".

Column 11, line 44, claim 6, "I" should be --1--.

Column 11, line 59, claim 7, delete "adapted to be".

Column 11, line 67, claim 7, delete "adapted to be".

Column 12, line 9, claim 7, "4WD" should be --four-wheel drive--.

Column 12, line 12, claim 7, "2WD" should be --two-wheel drive--.

Column 12, line 51, claim 10, "2WD" should be --two-wheel drive--.

Column 12, line 53, claim 10, "4WD" should be --four-wheel drive--.

UNITED STATES PATENT AND TRADEMARK OFFICE
CERTIFICATE OF CORRECTION

PATENT NO. : 5,599,249

DATED : February 4, 1997

INVENTOR(S) : John D. Zalewski, James S. Brissenden

It is certified that error appears in the above-indentified patent and that said Letters Patent is hereby corrected as shown below:

Column 12, line 62, claim 11, "2WD" should be --two-wheel drive--.

Column 12, line 65, claim 11, "4WD" should be --four-wheel drive--.

Column 13, line 4, claim 12, delete "adapted to be".

Column 13, line 12, claim 12, delete "adapted to be".

Column 13, line 32, claim 12, begin new paragraph with "second".

Signed and Sealed this

Twenty-eighth Day of October, 1997

Attest:

BRUCE LEHMAN

Attesting Officer

Commissioner of Patents and Trademarks